United States Patent [19]

Nagasawa

[11] Patent Number: 4,930,367
[45] Date of Patent: Jun. 5, 1990

[54] PERPENDICULARLY INTERSECTING GEAR DEVICE

[75] Inventor: Hidehiko Nagasawa, Shimizu, Japan

[73] Assignee: Koito Seisakusho Co., Ltd., Tokyo, Japan

[21] Appl. No.: 376,198

[22] Filed: Jul. 5, 1989

Related U.S. Application Data

[63] Continuation of Ser. No. 176,019, Mar. 31, 1988, abandoned.

[30] Foreign Application Priority Data

Apr. 2, 1987 [JP] Japan ............................ 62-50553[U]

[51] Int. Cl.⁵ ............................................ F16H 1/08
[52] U.S. Cl. ........................................ 74/416; 74/417; 74/423; 74/606 R
[58] Field of Search ................. 74/89.13, 416, 417, 74/423, 606 R

[56] References Cited

U.S. PATENT DOCUMENTS

| | | | |
|---|---|---|---|
| 600,482 | 3/1898 | Nichols | 74/417 |
| 840,171 | 1/1907 | Sturges | 74/423 |
| 2,997,894 | 8/1961 | Klein | 74/423 |
| 4,321,838 | 3/1982 | Feldman | 74/417 |
| 4,665,469 | 5/1987 | Furfari et al. | 74/606 R |
| 4,674,018 | 6/1987 | Ryder et al. | 362/424 |
| 4,689,725 | 8/1987 | Saijo et al. | 362/66 |
| 4,703,399 | 10/1987 | Van Duyn et al. | 362/66 |

FOREIGN PATENT DOCUMENTS

| | | | |
|---|---|---|---|
| 135156 | 3/1985 | European Pat. Off. | 74/417 |
| 1170023 | 1/1959 | France | 74/423 |
| 1325581 | 3/1963 | France | 74/423 |

Primary Examiner—Leslie A. Braun
Assistant Examiner—Scott Anchell
Attorney, Agent, or Firm—Sughrue, Mion, Zinn, Macpeak & Seas

[57] ABSTRACT

A perpendicularly intersecting gear device comprising a first bevel gear, a second bevel gear meshingly engaging perpendicular to the first bevel gear, a housing consisting of mutually mating first and second portions, and a drive shaft extending through and being secured to the first bevel gear. A pair of first bearing portions are provided in the first portion of the housing for supporting the drive shaft on opposite sides of the first gear. A second bearing portion is provided also in the first portion of the housing for supporting rotatably the second bevel gear which is disposed between the second bearing portion and the drive shaft.

8 Claims, 10 Drawing Sheets

PERPENDICULARLY INTERSECTING GEAR DEVICE

This is a continuation of application Ser. No. 176,019, filed Mar. 31, 1988.

FIELD OF THE INVENTION

The present invention relates to a perpendicularly intersecting gear device for transmitting a load between mutually perpendicularly intersecting input and output shafts.

DESCRIPTION OF PRIOR ART

FIGS. 9~12 show one example a of a prior art gear device for transmitting a load between two shafts which extend in perpendicularly intersecting directions. The device a comprises a housing consisting of a main body b and a cover c, a first bevel gear j, a shaft o of the first bevel gear j and a second bevel gear p.

Figure 9:
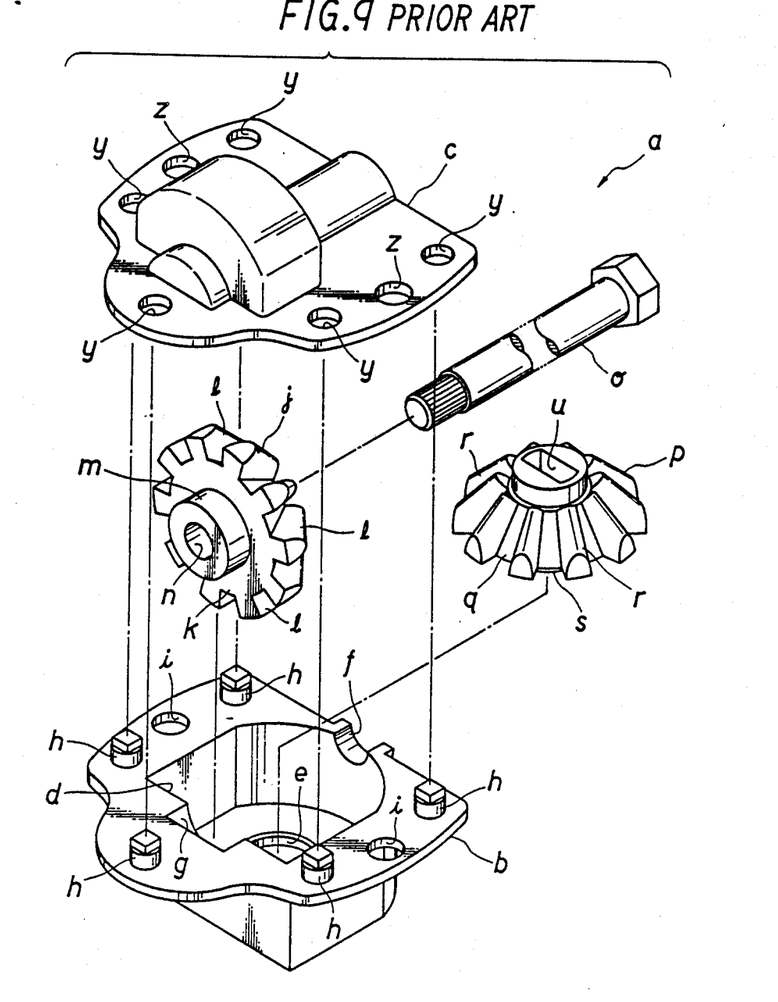
FIG. 9 is an exploded perspective view.

The housing main body b has defined therein a relatively large recess d for receiving gears j and p, and a circular bore e is formed in the bottom wall of the recess d. A semi-circular cutout f is formed in the upper edge of one of two opposing side walls of the recess d and a semi-circular cutout g is formed in the upper edge of the other of two opposing side walls of the recess d with the diameter of which is larger than that of the cutout f. A plurality of dowels or locating projections h, h are provided on the upper surface of the housing main body b, and two or more mounting bolt receiving holes i and i are formed as shown in FIG. 9.

The first bevel gear j comprises a generally frustconical main portion k having a plurality of radially extending gear teeth l, l in the sloped surface thereof, a stub shaft m projecting integrally from the bottom surface of the main portion k, and a central bore n for forcibly receiving and securing a drive shaft o.

The second bevel gear p comprises a generally frustconical main portion q having a plurality of radially extending gear teeth r, r in the sloped surface thereof, a stub shaft s projecting integrally from the bottom surface of the main portion q, and a non-circular connecting hole u extending through the central portion of the gear p.

Figure 10:
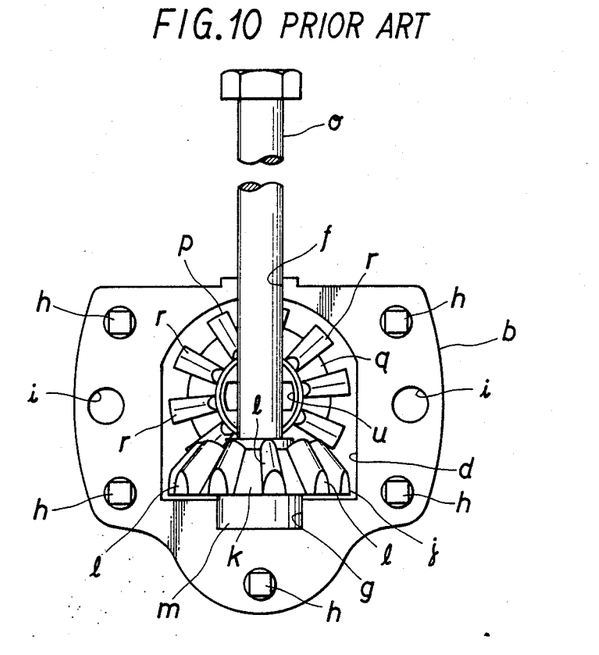
FIG. 10 is a rear view with a second portion of a housing being removed.

The second bevel gear p is received in the recess d in the housing main body b, with the stub shaft s being journalled in the bore e. The stub shaft m of the first bevel gear j is supported in the semi-circular cutout g and the drive shaft o is supported in the semi-circular cutout f in the housing main body b.

Figure 11:
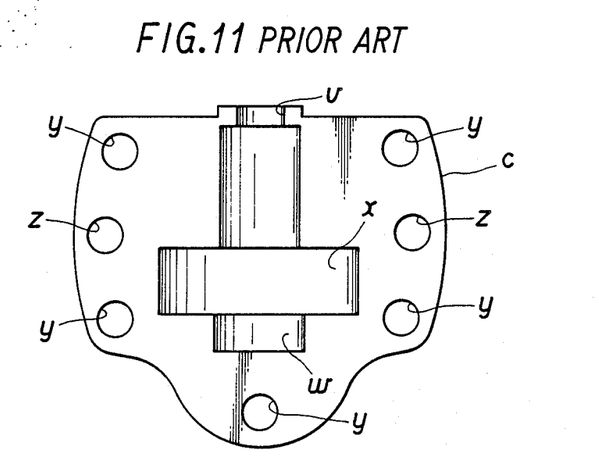
FIG. 11 is a front view of the second portion of the housing.
Figure 12:
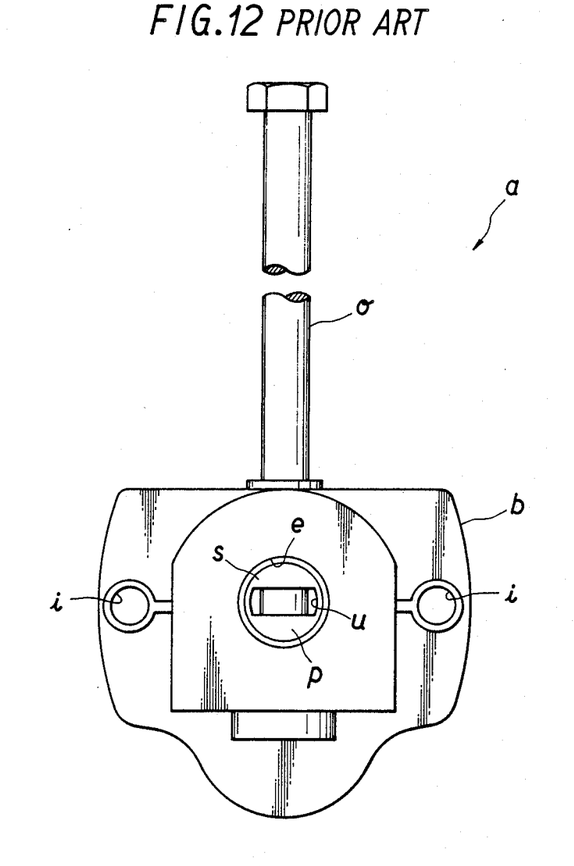
FIG. 12 is a front view.

The cover c is formed to have a semi-circular cutout v corresponding to the cutout f, a semi-circular cutout w corresponding to the cutout g, a recess x connecting the cutout f and the cutout g, a plurality of holes y, y corresponding to the dowels h, h and holes z and z corresponding to the bolt receiving holes i and i, such that when the cover c is assembled with the housing main body b, the dowels h, h act to locate the cover c relative to the housing main body b, and the tip ends of dowels h, h are caulked on the cover c, whereby the device a is assembled permanently.

When the drive shaft o is rotated, the rotation is transmitted through the first bevel gear j connected to the drive shaft o and the second bevel gear p to a second shaft (not shown) which is connected to the second bevel gear p through the connecting hole u and the axis of which extends perpendicular to the shaft o.

In operation, the load transmitted between the drive and the second shafts acts to separate the bevel gears j and p from each other. The force acting between the gears j and p tends to separate the cover c from the housing main body b which are connected together by relatively simple means such as caulking. Thus, during a long service period the cover c tends to separate from the housing main body b which may cause excessive clearance in the meshing engagement between the gears j and p resulting in excessive wear and breakage of gear teeth and may even cause the separation of the cover c from the housing main body b.

An object of the present invention is to overcome the above described shortcomings in the prior art device.

SUMMARY OF THE INVENTION

According to the invention, a gear device has a first bevel gear, a second bevel gear, a housing consisting of mutually mating first and second portions defining respectively gear receiving spaces therein, and a drive shaft extending through and being secured to the first bevel gear, a pair of first bearing portions being provided in the first portion of the housing and interposing therebetween the gear receiving space of the first portion and being adapted to rotatably receive the drive shaft, and a second bearing portion being provided in the first portion of the housing for rotatably supporting the second bevel gear which is disposed in the gear receiving space of the first portion of the housing and meshes with the first bevel gear.

According to the invention, both of the bevel gears are supported on the first portion of the housing, thus, the force acting between the gears is received by the first portion of the housing, and the force does not act on the second portion of the housing. Therefore, the meshing engagement of the gears is reliably maintained, and the second portion of the housing does not receive excessive force.

BRIEF DESCRIPTION OF THE DRAWINGS

Further objects and advantages of the present invention will become apparent from the following detailed description taken in conjunction with the drawings, in which:

FIG. 6 through FIG. 8 show an example of the gear device according to the invention as applied to an aiming apparatus of a headlight for an automobile, wherein: FIG. 9 through FIG. 12 show one example of a prior art perpendicularly intersecting gear device, wherein.

DETAILED DESCRIPTION OF PREFERRED EMBODIMENTS

Since one of preferred usage of the present invention is in an automobile headlight aiming apparatus description will first be made briefly with respect to the aiming apparatus shown in FIGS. 6~8 and, second, to details of a perpendicularly intersecting gear device.

Figure 6:
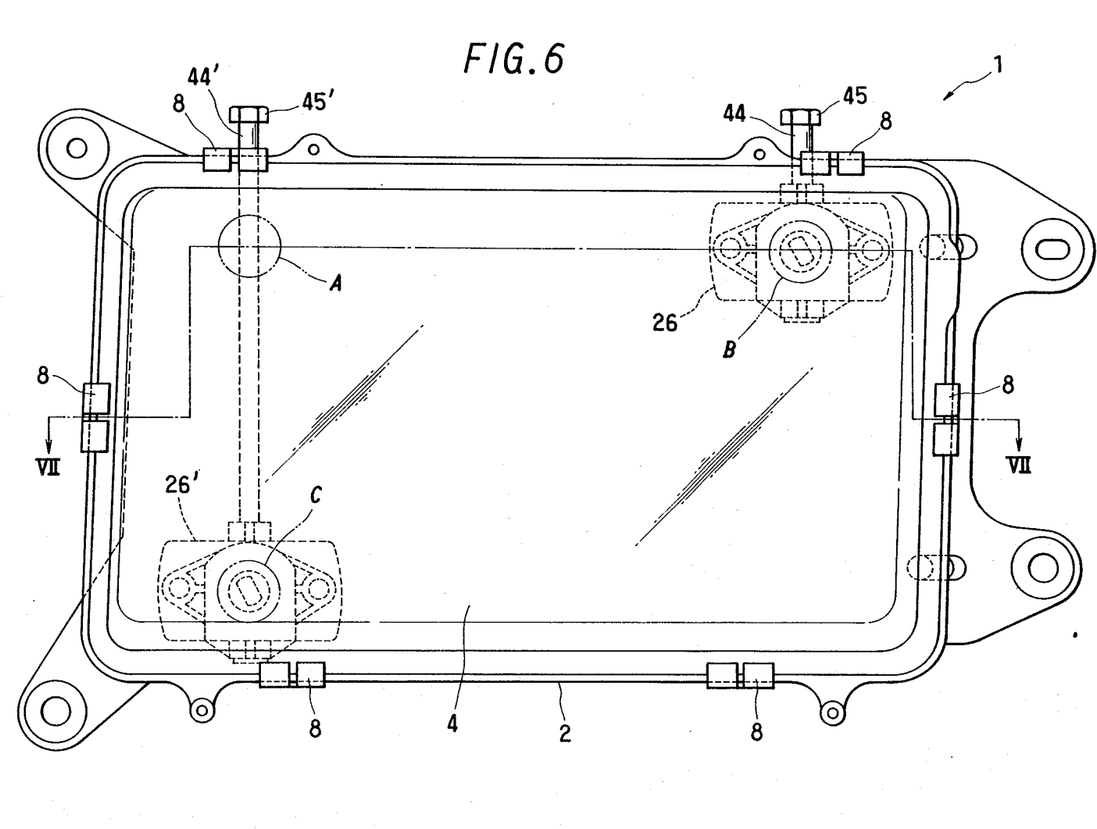
FIG. 6 is a front view.
Figure 7:
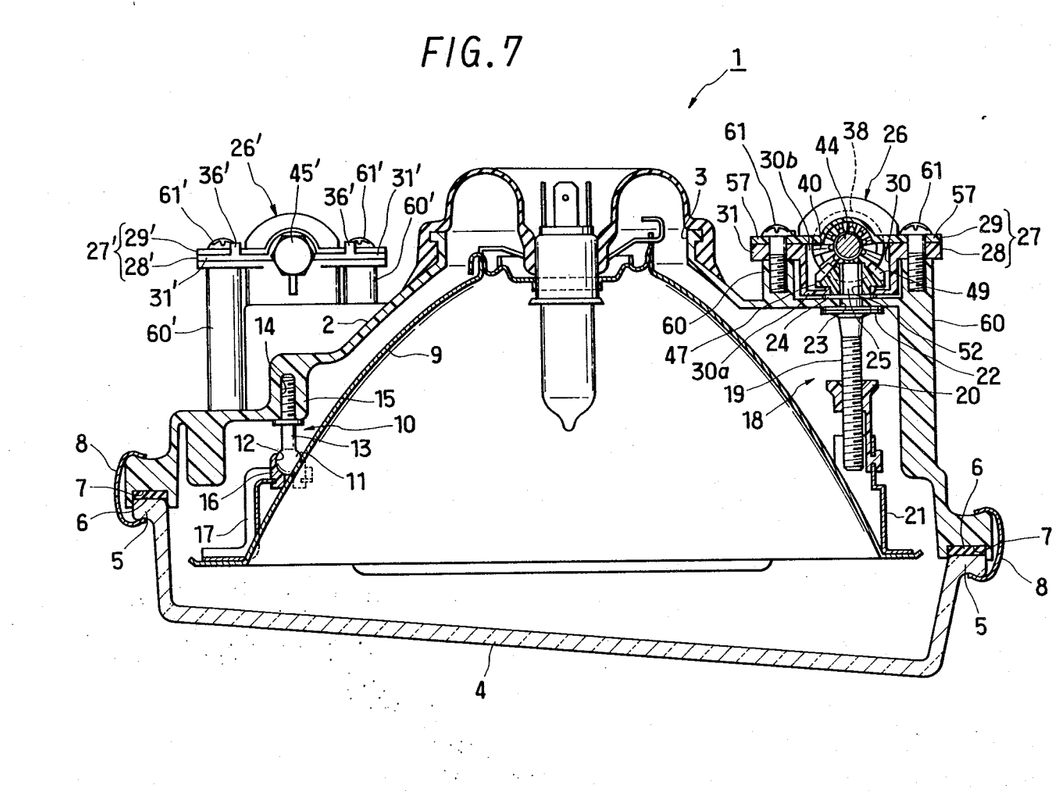
FIG. 7 is a sectional view taken along line VII—VII in FIG. 6.

In FIGS. 6 and 7, reference numeral 1 is a headlight for use in an automobile. The headlight 1 comprises a body 2 formed of synthetic resin material and having a large opening in the front end and a bulb inserting hole 3 in the central portion of the rear end. A lens 4 covers the large opening of the body 2 with a peripheral flange 5 of the lens 4 being mounted in a mounting groove 7 of the body 2 interposing therebetween a gasket 6 (FIGS. 7 and 8). The rear surface of the mounting groove 7 of the body 2 and the front surface of the flange 5 of the lens 4 are engaged by C-shaped clips 8 so as to secure the lens 4 on the body 2. A reflective mirror 9 formed of suitable metal is provided in a space defined by the body 2 and the lens 4. The mirror 9 is connected to the body 2 at following three points, namely, at point A on the left upper portion in FIG. 6 by a pivot supporting mechanism, at point B on a line extending rightward from the point A as viewed in FIG. 6 by an aiming mechanism, and at point C on a vertical line extending downward from the point A as viewed in FIG. 6 by another aiming mechanism.

The pivot supporting mechanism 10 at point A comprises a spherical projection 11 projecting from the body 2 and a spherical recess 12 formed on the reflective mirror 9. The spherical projection 11 is formed on one end of a rod 13, and the other end of the rod 13 is threaded to a boss portion 15 of the body 2. The spherical recess 12 is formed in a block 16 which is formed of a synthetic resin material and is secured to a bracket 17 which, in turn, is secured to the rear surface of an edge of an opening of the reflective mirror 9. The spherical projection 11 of the rod 13 rotatably engages with the spherical recess 12 in the block 16 thereby forming the pivot supporting mechanism 10 of a ball joint type.

Figure 8:
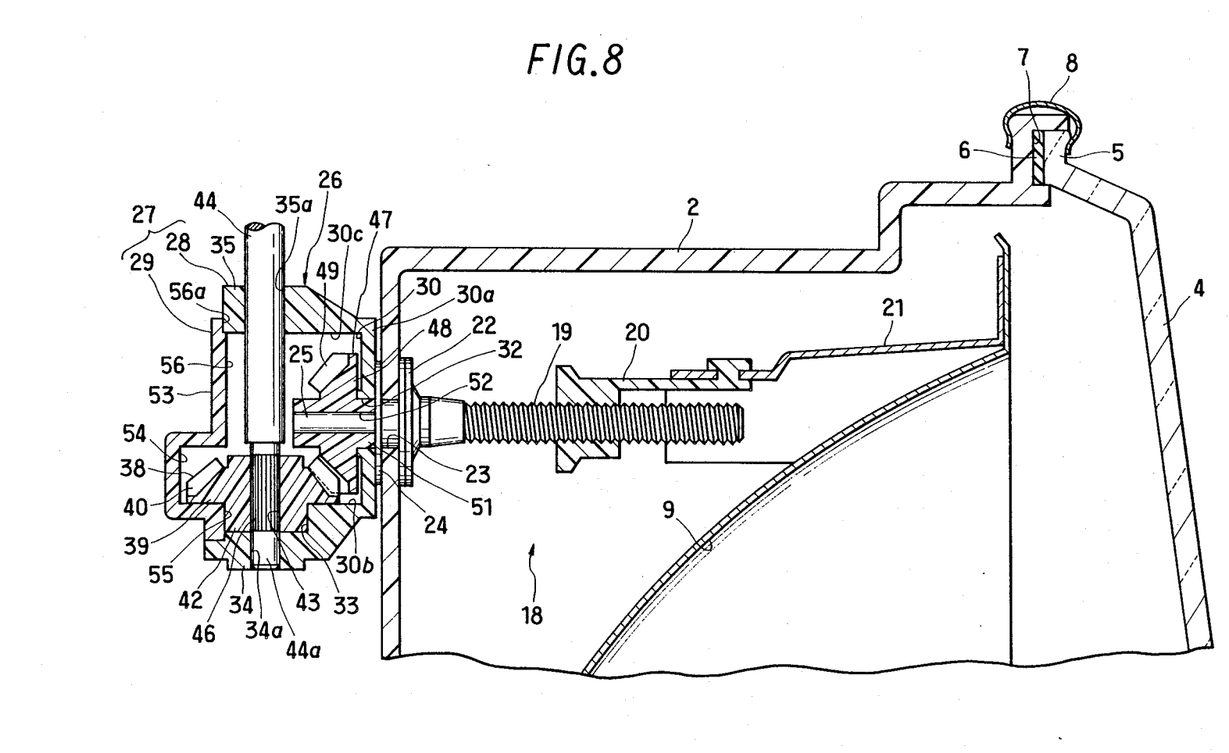
FIG. 8 is a partial sectional view.

The aiming mechanism 18 at point B comprises, as shown in FIGS. 7 and 8, an adjusting screw 19 rotatably supported on the body 2 and a nut 20 supported on the reflective mirror 9. The nut 20 is mounted on a bracket 21 which is secured to the rear surface of the edge of the opening of the reflective mirror 9 by welding and the like. A flange 22 is integrally formed on the screw 19, and a portion of the screw 19 extending rearward of the flange 22 is inserted through a hole 23 formed in the body 2. A washer 24 is secured to the adjusting screw 19 to clamp the body 2 between the flange 22 so as to rotatably locate the adjusting screw 19 with respect to the body. 2. The adjusting screw 19 has a non-circular portion 25 on the rearward of the washer 24 such as an elongated circular or oval form as shown in broken lines in FIG. 6.

A perpendicularly intersecting gear device 26 as shown in FIGS. 7 and 8 is mounted on the rear surface of the lamp body 2, and acts to rotate the adjusting screw 19. The device 26 has a housing 27 formed of a synthetic resin material and consisting of a first portion 28 and a second portion 29.

The first portion 28 has, as shown in FIGS. 1, 2, 5, 7 and 8, a generally rectangular box shaped gear receiving recess 30, flange portions 31 and 31 projecting outward from the upper (as viewed in FIG. 1) open edge of the recess 30, a circular bore 32 formed in the bottom wall 30a of the recess 30, a semi-circular recess 33 communicating with the recess 30 and in a side wall 30b of the recess 30 which side wall 30b opposing another side wall 30c in the longitudinal direction, and annular bearing portions 34 and 35. The bearing portion 34 is integrally formed on the side wall 30b, and is located outside of the semi-circular recess 33. The bearing portion 35 is integrally formed on the side wall 30c. The bearing portions 34 and 35 have aligning bores 34a and 35a respectively.

Figure 1:
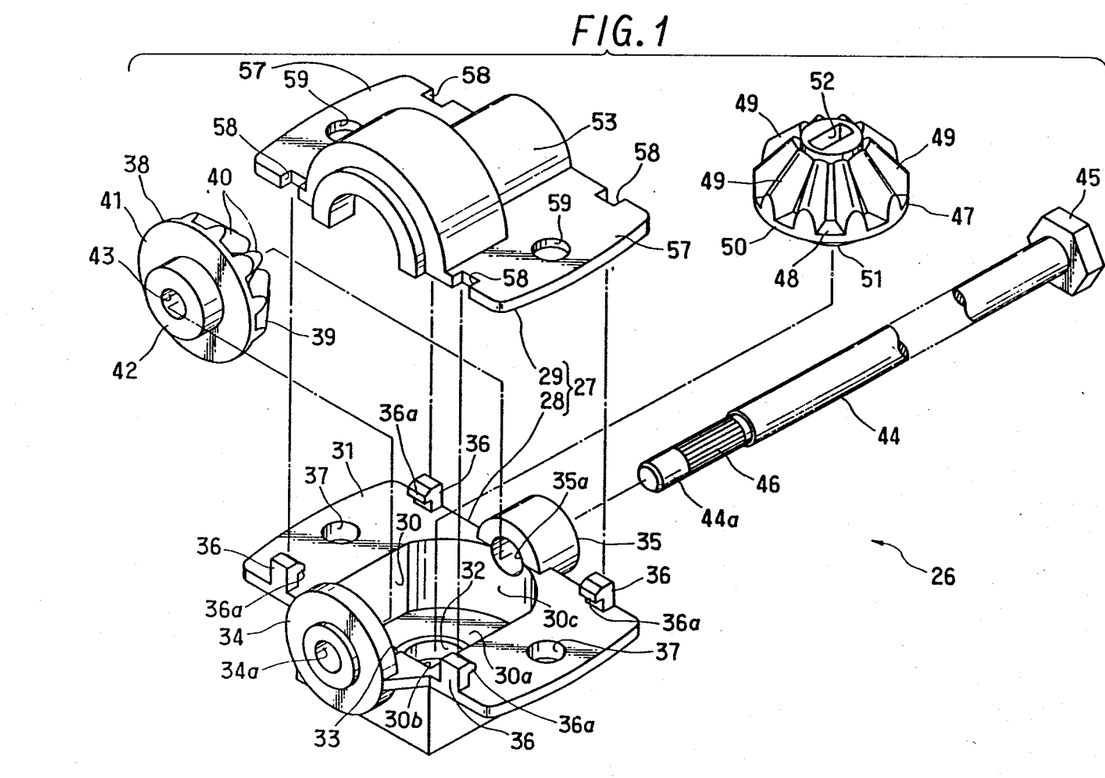
FIG. 1 is an exploded perspective view of a gear device according to one embodiment of the invention.

There are provided retaining projections 36, 36 having respectively pawls 36a, 36a on the flange portions 31 and 31. Further, mounting holes 37 and 37 are formed in the flange portions 31 and 31.

The device 26 further comprises a first bevel gear 38 as shown in FIGS. 1, 2, 7 and 8. The gear 38 comprises is integrally formed by a generally frust-conical main portion 39, a plurality of gear teeth 40, 40 formed in the sloped surface of the main portion 39, a generally disc shaped portion 41 formed on the rear surface of the main portion 39, a stub shaft 42 projecting from the disc shaped portion 41 and a central bore 43 extending through the gear 38. The gear 38 is preferably formed of synthetic resin material such as nylon and the like having a low frictional coefficient and high strength.

The first gear 38 is connected to a drive shaft 44 which is shown in FIGS. 1, 2, and 4~8. The shaft 44 is formed of a material such as steel, and has a head portion 45 on one end and a knurled portion 46 adjacent its tip end portion 44a.

Figure 2:
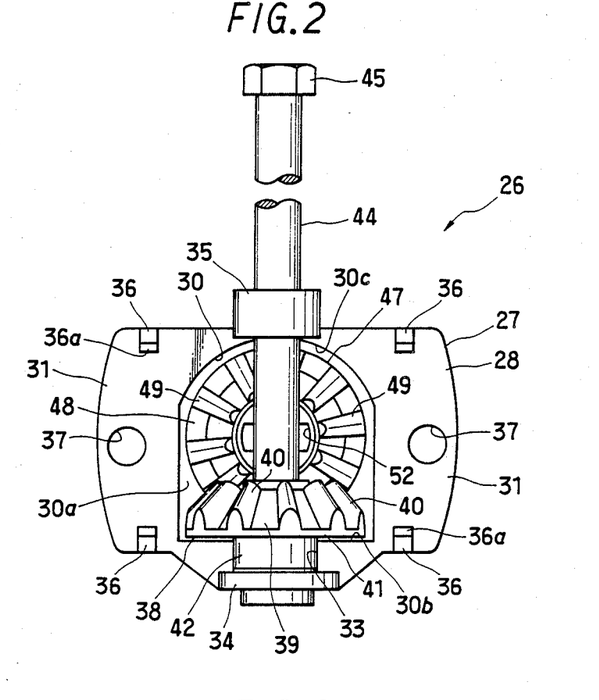
FIG. 2 is a rear view of the device of FIG. 1 or a view as viewed from upward of FIG. 1 with a second portion or a cover of the housing being removed.

The drive shaft 44 is inserted through the first bevel gear 38 forcibly, and the tip end 44a projects out of the stub shaft 42 of the bevel gear 38 and is supported rotatably in the bore 34a of the bearing portion 34 of the first portion 28. The shaft 44 is rotatably inserted through the bore 35a of the bearing portion 35 at a location slightly spaced from the bevel gear 38.

A second bevel gear 47 is also formed of synthetic resin material such as nylon and the like, and is integrally formed by a generally frust-conical main portion 48, a plurality of gear teeth 49, 49 formed in the sloped surface of the main portion 48, a generally disc shaped portion 50 formed on the rear surface of the main portion 48, a stub shaft 51 projecting from the disc shaped portion 50 and a central non-circular connecting hole 52 extending through the gear 47, as shown in FIGS. 1, 2, 7 and 8. The gear 47 is received in the gear receiving recess 30 of the first portion 28 and between the bottom wall 30a and the drive shaft 44 being supported on the portion 28, with the stub shaft 51 being rotatably received in the bore 32 in the bottom wall of the recess 30, and the gear teeth 49, 49 facing the drive shaft 44. The upper end of the main portion 48 of the second gear 47 is, at this condition, spaced slightly from the drive shaft 44 and the gear teeth 49, 49 mesh with the gear teeth 40, 40 of the first bevel gear 38.

During assembly the second bevel gear 47 is first located in the gear receiving recess 30, then the first bevel gear 38 is located in the recess 30, and the drive shaft 44 is inserted through the bore 35a, forcibly through the bore 43 of the gear 38, and through the bore 34a of the portion 28.

The housing second portion 29 shown in FIGS. 1, 3, 4, 7 and 8 includes, a generally semi-cylindrical main portion 53, a large diameter semi-cylindrical portion 54 defining a gear receiving recess, a semi-circular recess 55 formed in one end of the main portion 53, an elongated recess 56 formed in the other end portion of the main portion 53, and a slightly increased diameter portion 56a formed in one end of the recess 56.

Figure 3:
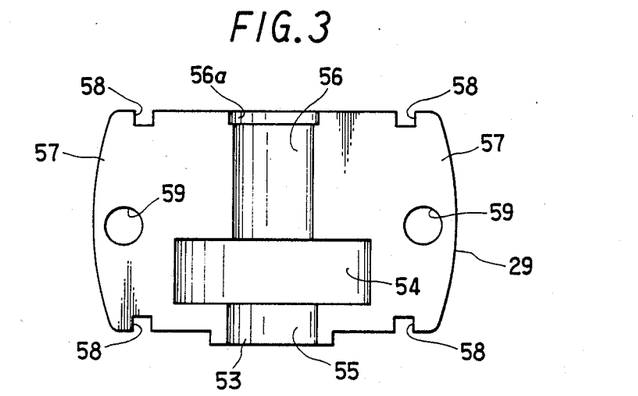
FIG. 3 is a view showing the inner surface of the second portion of the housing.
Figure 4:
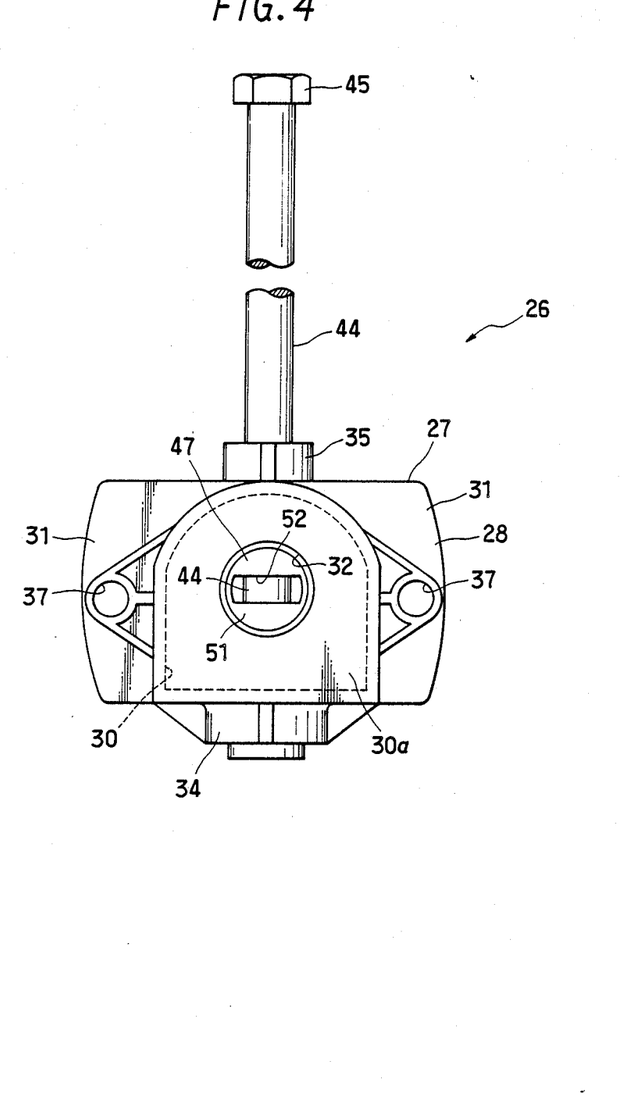
FIG. 4 is a front view of the device of FIG. 2.
Figure 5:
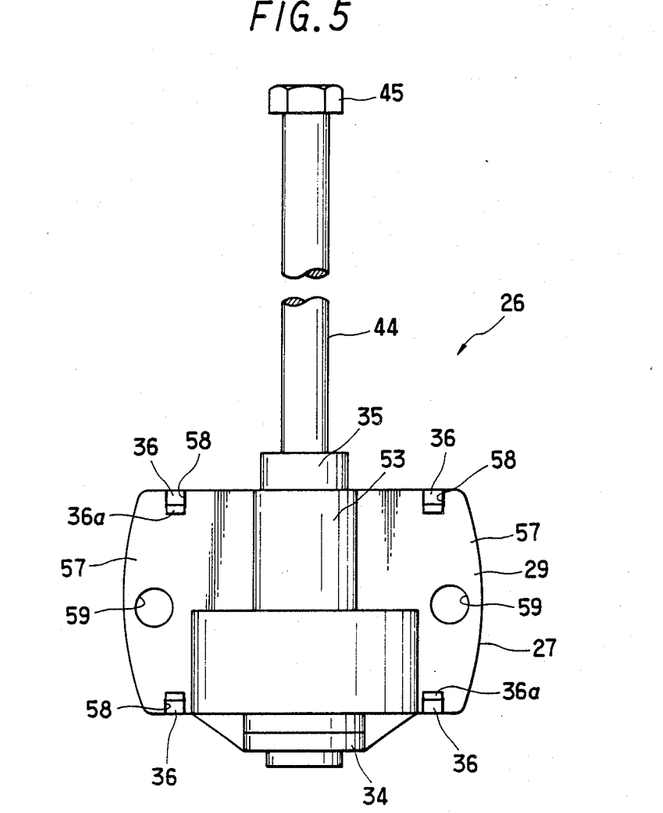
FIG. 5 is a rear view of the device of FIG. 1 in assembled condition.

Further, the portion 29 has flanges 57 and 57 extending integrally outward from opposite side edges of the main portion 53 corresponding to flanges 31 and 31 of the housing portion 28. Cutouts 58, 58 are formed in the flanges 57 and 57 for receiving the retaining projections 36, 36 on the flanges 31 and 31 of the housing portion 28. Mounting holes 59 and 59 corresponding to the mounting holes 37 and 37 in the flanges 31 and 31 of the portion 28 are formed in the flanges 57 and 57.

When the housing portion 29 is mounted on the portion 28, the pawls 36a, 36a of the retaining projections 36, 36 engage respectively engage with the cutouts 58, 58 of the housing portion 29, whereby the portion 29 is secured to the portion 28.

Now, mounting of the gear devices 26 on the lamp body 2 will be explained with reference to FIGS. 6, 7 and 8. There are provided mounting projections 60 and 60 on the rear surface of the lamp body 2 to define the holes 23 respectively. Each of the gear devices 26 is mounted on the projections 60 with the side of the bottom wall 30a of the gear receiving recess 30 of the housing portion 28 facing the hole 23. The flanges 31, 31 and 57, 57 of the housing 27 are secured to the mounting projections 60 and 60 by mounting bolts 61 and 61 passing through mounting holes 31 and 59 in the housing 27. Non-circular portion 25 of the adjusting screw 19 is fitted in the connecting hole 52 of the second bevel gear 47. The drive shaft 44 extends upward as viewed in FIG. 6, with the head portion 45 being on a level nearly equal to the upper edge of the lamp body 2. An aiming mechanism 18' substantially similar to the aiming mechanism 18 described as above is provided at point C. Accordingly, description of the aiming mechanism 18' will be omitted with parts corresponding to the mechanism 18 being denoted by the same reference numerals marked with a prime.

The operation of the aiming mechanism 18 for moving pivotally or inclining the reflective mirror 9 will now be described.

The drive shaft 44 of the device 26 of the aiming mechanism 18 is rotated in a desired direction. Then, the first bevel gear 38 connected to the drive shaft 44 rotates thereby causing the second bevel gear 47 to rotate. The rotation of the second bevel gear 47 rotates the adjusting screw 19 with the non-circular portion 25 of the rear end of the adjusting screw 19 engaging the connecting hole 52 of the second gear 47. When the adjusting screw 19 is rotated in the direction threaded into the nut 20, the nut 20 moves rearward along the adjusting screw 19, whereby a portion of the mirror 9 where the nut 20 is mounted moves in the rear direction with respect to the lamp body 2.

When the adjusting screw 19 is rotated in the direction threaded out of the nut 20, the nut 20 moves forward along the adjusting screw 19, whereby a portion of the mirror 9 where the nut 20 is mounted moves in the forward direction with respect to the lamp body 2. Accordingly, by adjusting the amount of threading engagement of the adjusting screw 19 relative to the nut 20, the space between the lamp body 2 and the reflective mirror 9 at the location of the aiming mechanism 18 is adjusted, and the mirror 9 moves around a line connecting the pivotal supporting portion 10 and the other aiming mechanism 18', and the light beam of the headlight can be directed to a desired direction.

The operation of the aiming mechanism 18' is similar to that of the aiming mechanism 18.

In the perpendicularly intersecting gear device 26 (26'), even though a large load acts on the side of the second bevel gear 47 (47'), the force which tends to separate the first bevel gear 38 (38') from the second bevel gear 47 (47') is received, on one hand, by the bottom wall 30a (30'a) of the gear receiving recess 30 of the first portion 28 (28') of the housing 27 (27') and, on the other hand, by the bearing portions 34 and 35 (34' and 35') of the housing first portion 28 (28') through the drive shaft 44 (44'). Since the bottom wall 30a and the bearing portions 34 and 35 are integrally formed, the space between the bevel gears is maintained reliably, and failure of the gear teeth is prevented. Further, the second portion 29 (29') of the housing does not receive any substantial force and acts simply as a cover, thus, relatively simple retaining means such as pawls 36a can be utilized.

In the embodiment, the gear teeth 40, 40 and 49, 49 of the bevel gear 38 and 47 are respectively connected integrally through the disc portions 41 and 50 which is effective to augment the strength of gear teeth and to prevent the failure of the gear teeth.

As described heretofore, according to the invention even though a large load acts on the side of the second bevel gear or on the output side, the force which tends to separate the first bevel gear from the second bevel gear is received, on the one hand, by the bottom wall of the gear receiving recess of the first housing portion and, on the other hand, by the drive shaft which is supported on the bearing portions of the first housing portion. Thus, the space between the bevel gears is maintained reliably, and both failure of the gear teeth and housing can be prevented.

The invention has been described with respect to the aiming apparatus of an automobile headlight, however, the invention is not limited to the specified usage.

What is claimed is:

1. A perpendicularly intesection gear device comprising a first bevel gear, a second bevel gear for meshing with the first bevel gear, a housing comprising mutually mating first and second portions defining respective gear receiving spaces therein, a drive shaft extending through and being secured to the first bevel gear, the first portion of the housing having a pair of first bearing portions formed integrally therewith as a continuation of the material of said first portion for rotatably supporting the drive shaft, the first bearing portions being disposed on opposing sides of the gear receiving space and of the first bevel gear and being adapted for rotatably supporting the drive shaft at a tip end thereof and at a position on the opposite side of said first bevel gear from said tip end, respectively, and the second bevel gear being disposed in the gear receiving space of the first portion of the housing so as to be rotatably and axially stationarily supported therein in mesh with the first bevel gear; the first and second housing portions having cooperating flanges for securing the first housing portion to the second housing portion, the flanges defining a plane which includes the axis of the drive shaft.

2. A perpendicularly intersecting gear device as set forth in claim 1, wherein a non-circular connecting hole is formed in the second bevel gear to connect the second gear with an adjusting shaft.

3. A perpendicularly intersecting gear device as set forth in claim 1, wherein the gear receiving space of the first portion of the housing receives therein the second bevel gear and a part of the first bevel gear, and the gear receiving space of the second portion of the housing receives therein a part of the first bevel gear.

4. A perpendicularly intersecting gear device as set forth in claim 1, wherein the second bevel gear is disposed between the drive shaft and a side of said first portion of the housing.

5. A perpendicularly intersecting gear device as set forth in claim 4, wherein the second bevel gear is spaced by a small distance from the drive shaft.

6. A perpendicularly intersecting gear device as set forth in claim 1, wherein the first and second portions of the housing are connected by retaining pawls formed on either of said first and second portions to engage with the other of the first and second portions of the housing.

7. A perpendicularly intersecting gear device as set forth in claim 1, wherein each of said bevel gears comprises gear teeth and a disc portion integrally connected to the gear teeth.

8. A perpendicularly intersecting gear device as set forth in claim 1, wherein each of said bevel gears is formed of synthetic resin material having low frictional coefficient.

* * * * *